Dec. 28, 1943.　　　C. W. WALZ　　　2,337,699
BEET HARVESTER
Filed Dec. 21, 1940
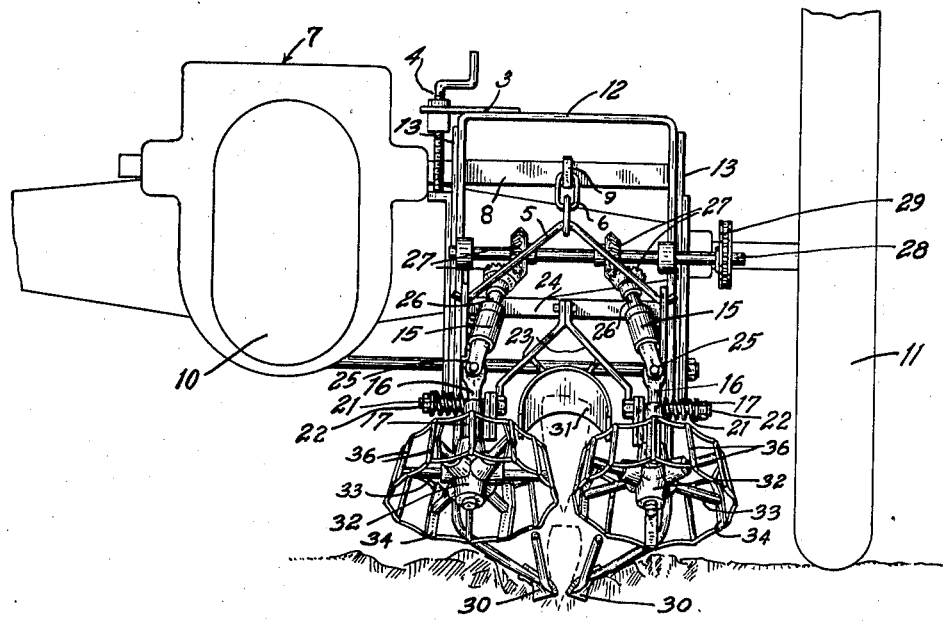
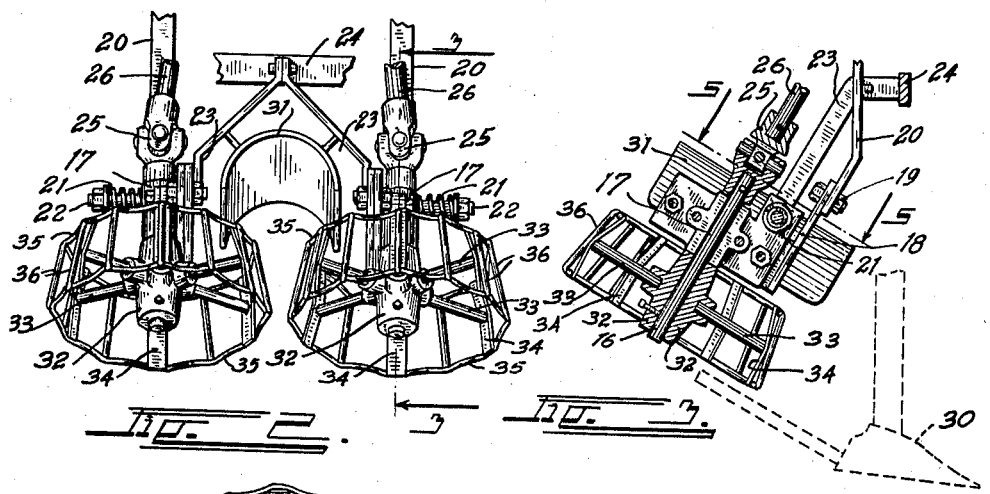
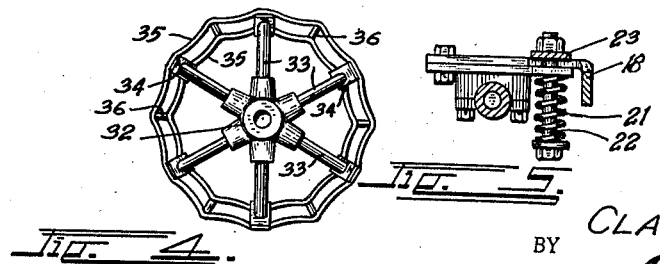
INVENTOR.
CLAUDE W. WALZ.
BY
*R. H. Galbreath*, Attorney Patented Dec. 28, 1943

2,337,699

UNITED STATES PATENT OFFICE 2,337,699

BEET HARVESTER

Claude W. Walz, Avondale, Colo.

Application December 21, 1940, Serial No. 371,152

18 Claims. (Cl. 55—106)

This invention relates to a sugar beet harvester and more particularly to means for picking up and delivering the beets as they are lifted from the ground by the lifting plows.

The invention is more particularly designed for use with a beet harvester of the type illustrated in applicant's copending application Serial No. 324,645, of which this application is a continuation in part.

The principal object of the invention is to provide two beet engaging wheels of a highly efficient type which will engage opposite sides of each beet and lift it from the ground; separate it from the clods and soil; and deliver it either back upon top of the ground or to any suitable receiving apparatus, such as a loading conveyor or dump hopper such as used in beet harvesting machinery.

Other objects of the invention are to provide beet engaging wheels which will automatically accommodate themselves to differing sizes of beets; which will not become clogged with dirt, trash, clods, etc.; and which will firmly hold the beets in an aligned, upright position.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:

Fig. 1 is a rear view of a typical beet harvester illustrating the improved beet lifting mechanism in place thereon;

Fig. 2 is an enlarged rear view of the improved beet lifting wheels;

Fig. 3 is a longitudinal section through one of the wheels, taken on the line 3—3, Fig. 2;

Fig. 4 is a top view of one of the wheels removed from its shaft; and

Fig. 5 is a cross section through a portion of the wheel supporting frame, with the wheel removed therefrom. This section is taken on the line 5—5, Fig. 3.

In Fig. 1, the rear extremity of a typical tractor, to which a beet harvesting mechanism is attached, is indicated at 10 with the wheel thereof at 11. The improved lifting mechanism may be supported from a fixed frame 13 secured to the tractor in any desired manner, for instance, as illustrated in applicant's copending application, Serial No. 324,645. A vertically movable frame 12 is mounted on the fixed frame 13 and can be raised and lowered thereon by a lift lever 9 secured on a power lift rockshaft 8, which is connected to the power lift mechanism 7 of the tractor 10. The lever 9 is connected to the vertically movable frame 12 by chain links 6 and a rod 5 passing through the lower link and hooked at opposite ends to the frame 12. The rockshaft 8 is suitably journaled in the upper portion of the fixed frame 13. The proper digging depth can be pre-set by means of a threaded adjusting crank 4, threaded through a projecting portion 3 of the movable frame 12, and contacting the fixed frame 13 to limit the downward movement of the movable frame 12. The entire lifting mechanism is supported from this movable frame and is raised and lowered therewith.

The lifting mechanism comprises a pair of open, multi-sided, conical, lifting wheels mounted on wheel shafts 16 journalled in shaft journals 17. The journals 17 are secured on the lower extremities of hinged arms 18. Each of the hinged arms 18 is mounted on a hinge bolt 19 on the lower extremities of a fixed bar 20. The bars 20 extend downwardly from the vertically movable frame 12.

This construction allows the shafts 16 to swing freely sideward from the hinge bolts 19. The two shafts and, of course, the wheels thereon are constantly urged toward each other by means of suitable compression springs 21. The compression springs are compressed beneath the heads of bolts 22 which extend through the lower extremities of a pair of fixed braces 23. The fixed braces are permanently secured to a cross bar 24 in the vertically movable frame 12. Thus, as the two wheels are forced apart, they will act against the springs 21.

Power is transmitted to the wheels through the medium of universal joints 25 which connect each of the shafts 16 with a gear shaft 26. The gear shafts are mounted in fixed bearings 15 and are rotated through the medium of beveled gears 27 mounted on a countershaft 28. The countershaft is driven from any suitable source of power, for instance, from the axle of the tractor wheel 11, through the medium of a drive chain 29.

The lifting wheels are supported in spaced relation with their axes at a rearward and downward incline directly to the rear of a pair of beet lifting plows. The position of such plows is indicated at 30, in Fig. 1 and in broken line in Fig. 3. These plows engage the earth along the opposite sides of a row of beets and act to lift the beets and the clods from the row. The lifted beets are then engaged between the wheels which are rotating rearwardly at their adjacent sides. As the beets pass between the wheels the latter are forced outwardly about the axis of the hinge bolts 19 to allow passage of the beets and the latter are thrown from the rear sides of the wheels. It will be noted that this hinged, spring-actuated, swinging action of the wheels allows them to automatically space themselves in accordance with the size of the beet.

A hood 31 is supported from the fixed braces 23 to prevent the beets from passing over the wheels. Should an unusually high beet be encountered or should the plows lift the beets to an unusual height, their crowns will strike this hood and be guided thereby rearwardly between the lifting wheels.

It is desired to call particular attention to the construction of the lifting wheels. Each consists of a hub member 32 provided with a plurality of radial spoke sockets. Spokes 33 extend radially outward from the hub member to a connection with resilient rim plates 34. The rim plates support a pair of corrugated hoops 35 which form the two side edges of the wheel. The upper hoop is of smaller diameter than the lower hoop so as to impart a frusto-conical shape to the wheel. The two hoops are connected together at the high points of their peripheries by means of cross bars 36. The corrugations in the hoops allow them to conveniently engage the rounded sides of the beets, thus forming beet-receiving pockets, and the open spaces between the cross bars permit the rounded sides to project into the wheels to be firmly gripped thereby.

It will be noted that the hoops 35 and the cross bars 36 are members of small diameter, in the nature of rods, and by virtue of this construction the area of contact between the lifting wheels and the beet therebetween is quite small. This has the advantage that, without requiring excessive spring pressure, encrusted soil, clods and the lie clinging to the beet are broken and fall away from the beet, yet the pressure with which the wheels engage the beet is not great enough to damage it.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A lifting wheel construction for beet harvesters for engaging beets and directing them with increased velocity toward a point of reception, said wheel construction comprising: a hub member; a plurality of radially extending spokes extending from said hub member; two concentrically spaced-apart hoops suspended from said spokes; and a plurality of cross pieces extending between said hoops in spaced-apart relation, said hoops being arced inwardly intermediate said cross pieces to provide beet-receiving pockets.

2. A beet lifting device for beet harvesters comprising: a pair of opposed positively driven wheels mounted for rotation about generally upwardly and forwardly extending axes and arranged adjacent one another in laterally spaced relation so as to be rotatable generally rearwardly and upwardly at their lower adjacent peripheries; means for hinging the upper end of the axes of said wheels so that their lower portions may swing away from each other; and spring means for urging said wheels toward each other to grasp beets and propel them upwardly and rearwardly therefrom.

3. A beet lifting device for beet harvesters comprising: plow means for lifting beets out of the ground, a pair of opposed positively driven wheels disposed behind said plow means to grasp beets lifted thereby, said wheels being mounted for rotation about generally upwardly extending axes and arranged adjacent one another in laterally spaced relation so as to be rotatable generally rearwardly at their adjacent peripheries; a generally upwardly extending wheel shaft in each wheel; journals carrying said wheel shafts; brackets supporting said journals; means for hingedly mounting the upper ends of said journals so that the wheels may swing laterally about generally fore and aft extending axes toward and away from each other at their lower portions; and spring means acting against said journal mounting means for urging said journals toward each other.

4. A beet lifting device for beet harvesters comprising: a pair of opposed positively driven wheels rotating rearwardly at their adjacent peripheries; means for hinging the axes of said wheels so that they may swing away from each other; spring means for urging said wheels toward each other; and an inclined hood supported between and over said wheels to engage the crowns of the beet to guide the latter between the wheels.

5. In a beet harvester having beet digging plows, means for lifting the beets from said plows comprising a pair of wheels positioned to the rear of said plows so that the beets leaving said plows will pass between the wheels of the pair, each wheel including a beet-engaging peripheral portion which is resiliently mounted so as to be generally radially yieldable and can therefore accommodate the passage of both large and small beets between said wheels, and means for rotating the wheels rearwardly at their adjacent peripheries so as to grip and propel the beets rearwardly.

6. In a beet harvester, a main frame, a vertically shiftable frame carried thereby, a crank screw threaded through one of said frames and engageable with the other to limit the depth of operation, a pair of rotatable beet lifting wheels, and means supporting said wheels on said vertically shiftable frame for lateral movement toward and away from one another.

7. A beet harvester comprising a pair of lifting plows, each comprising a beet loosening blade adapted to enter the ground and having an upwardly and rearwardly lifting section, and a pair of rotatable beet lifting wheels disposed rearwardly of said blades and a short distance above the rear portions of said plow sections and mounted for rotation in planes extending upwardly and rearwardly alongside the upwardly and rearwardly extending plane of said sections, each of said wheels comprising a hub and a rim portion resiliently mounted thereon for radial movement relative thereto.

8. In a beet harvester, a beet engaging member comprising a cage-like part having two axially spaced ring-like portions formed to engage upper and lower portions of a beet and connector portions connecting said axially spaced portions and spaced peripherally on said latter so as to engage the sides of a beet held by said ring-like portions, both said ring-like portions and said connector portions being relatively narrow so as to engage a beet with only small area of contact, and means for resiliently urging said member toward a position contacting the beet with sufficient force to break clods and the like clinging to the beet.

9. In a beet harvester, a beet engaging member comprising a cage-like part having upper and lower axially spaced ring-like portions formed with inwardly curved sections to embrace and partially surround the upper and lower parts of a beet, said upper portion having an appreciably smaller diameter than said lower portion, and generally axially directed connectors connecting the end portions of said curved sections, said connectors being adapted to engage the sides of a beet.

10. A beet lifting device for beet harvesters and the like, comprising a pair of beet engaging means, and an arcuate beet engaging hood supported between and over said pair of means to engage the crowns of the beets to guide the latter between said two means.

11. A beet lifting device for beet harvesters and the like, comprising a pair of beet engaging means, and an arcuate beet engaging hood supported in a generally transversely arched, longitudinally extending position between said pair of means to engage the crowns of the beets to guide the latter between said two means.

12. A beet lifting device for beet harvesters and the like, comprising a pair of beet engaging members, each comprising a truncated conical member having peripheral beet-receiving sections, said members being arranged with their smaller ends uppermost, and an arcuate beet-engaging hood supported substantially midway and arched transversely between and above the smaller ends of said members for engaging the crowns of the beets to guide the latter between said members.

13. In a beet harvester, the combination of a pair of beet lifting plows and a pair of generally rearwardly and upwardly extending beet guiding runners connected respectively with said plows and spaced apart laterally, and a pair of opposed positively driven wheels disposed rearwardly and upwardly of said plows and rotatable generally in a plane adjacent and substantially parallel to the plane of said plow runners for picking up beets from said runners, said wheels overlying the rear portions of said runners and having their adjacent inner sections disposed laterally inwardly, respectively of said runners.

14. In a beet harvester, the combination of a pair of beet lifting plows and a pair of generally rearwardly and upwardly extending beet guiding runners connected respectively with said plows and spaced apart laterally, a pair of opposed positively driven wheels disposed rearwardly and upwardly of said plows and rotatable generally in a plane adjacent and substantially parallel to the plane of said plow runners for picking up beets from said runners, said wheels overlying the rear portions of said runners and having their adjacent inner sections disposed laterally inwardly, respectively of said runners, and means yieldingly mounting said wheels for lateral movement to permit them to accommodate beets of different sizes guided into said wheels by said runners.

15. The combination with a tractor having a rear axle housing with lateral housing extensions, of a framework adapted to be fixed to the lateral housing extension at one side of the tractor, a frame shiftable vertically relative to said framework, beet lifting means carried by said vertically shiftable frame, beet ejecting means also carried by said vertically shiftable frame and adjustable relative to said beet lifting means, and means actuated by the power of the tractor for raising said shiftable frame and the beet lifting and ejecting means carried thereby.

16. The combination with a tractor having a rear axle housing with lateral housing extensions, of a framework adapted to be fixed to the lateral housing extension at one side of the tractor, a frame shiftable vertically relative to said framework, beet lifting means carried by said vertically shiftable frame, beet ejecting means also carried by said vertically shiftable frame and adjustable relative to said beet lifting means, and means for adjusting the position of the vertically shiftable frame relative to said tractor-carried framework.

17. A beet lifting device for beet harvesters comprising a pair of opposed beet engaging members rotating about approximately vertical axes and arranged to swing laterally outwardly about approximately horizontal longitudinally extending axes passing generally above said members, each of said members comprising a supporting hub and a cage resiliently mounted thereon by means providing for a limited amount of radial movement relative thereto, and means for rotating said members.

18. The combination with a tractor having a rear axle housing with lateral housing extensions, of a framework adapted to be fixed to the lateral housing extension at one side of the tractor, a frame shiftable vertically relative to said framework, beet lifting means carried by said vertically shiftable frame, a pair of rotatable generally downwardly and rearwardly extending shafts, means for supporting said shafts on said vertically shiftable frame for rotation and for generally lateral swinging relative to said beet lifting means, rotatable beet engaging means fixed to the lower end of each of said shafts and disposed rearwardly of said beet lifting means, spring means for urging said beet engaging means toward each other, and means actuated by the power of the tractor for raising said shiftable frame and the beet lifting means and the rotatable beet engaging means carried by said shiftable frame.

CLAUDE W. WALZ.